United States Patent
Blendea et al.

(10) Patent No.: US 7,329,199 B2
(45) Date of Patent: Feb. 12, 2008

(54) IN-LINE ACTUATOR APPARATUS AND METHOD

(75) Inventors: Horia Blendea, LaSalle (CA); Christian Fiedler, Windsor (CA)

(73) Assignee: Schukra of North America, Lakeshore-Tecumseh, Ontario (CA)

( * ) Notice: Subject to any disclaimer, the term of this patent is extended or adjusted under 35 U.S.C. 154(b) by 106 days.

(21) Appl. No.: 11/042,384

(22) Filed: Jan. 25, 2005

(65) Prior Publication Data

US 2005/0183525 A1    Aug. 25, 2005

Related U.S. Application Data

(60) Provisional application No. 60/542,365, filed on Feb. 6, 2004.

(51) Int. Cl.
*F16H 3/72* (2006.01)
*F16H 29/20* (2006.01)

(52) U.S. Cl. .................. 475/4; 74/89.23; 74/89.31

(58) Field of Classification Search .......... 74/89.23, 74/89.24, 89.31, 89.34; 475/3, 4
See application file for complete search history.

(56) References Cited

U.S. PATENT DOCUMENTS

| | | | |
|---|---|---|---|
| 823,971 A | 6/1906 | Remondy | |
| 1,426,109 A | 8/1922 | Rudolph et al. | |
| 2,405,338 A * | 8/1946 | Werner | 475/4 |
| 2,615,683 A * | 10/1952 | McCallum | 74/841 |
| 3,038,352 A * | 6/1962 | Murphy | 475/2 |
| 3,631,951 A | 1/1972 | Quenneville | |
| 3,726,370 A | 4/1973 | Hubbard, Jr. | |
| 3,759,358 A | 9/1973 | Quenneville | |
| 3,796,292 A | 3/1974 | Harrison | |
| 3,876,184 A | 4/1975 | Eudy | |
| 4,014,422 A | 3/1977 | Morishita | |
| 4,222,608 A | 9/1980 | Maeda | |
| 4,316,631 A | 2/1982 | Lenz et al. | |
| 4,354,709 A | 10/1982 | Schuster | |
| 4,494,709 A | 1/1985 | Takada | |
| 4,531,417 A * | 7/1985 | Hollman | 74/96 |

(Continued)

FOREIGN PATENT DOCUMENTS

DE    29 47 472    8/1980

(Continued)

OTHER PUBLICATIONS

International Search Report for PCT/US2005/002196.

*Primary Examiner*—Ha D. Ho
(74) *Attorney, Agent, or Firm*—Grant D. Kang (57) ABSTRACT

An actuator having an electric motor with a rotor shaft engaged with a gear set within a housing is provided. As an example, the gear set may be a planetary gear set. The planetary gears are engaged with a disk. The disk is fixed to a shaft rod or other force transmitting component such as lead screw. The lead screw is engaged with a traveling block. When the load screw rotates, the traveling block moves along the lead screw. The lateral movement of the traveling block may be linked to further force application devices, such as a pin or a cable. In one embodiment, the rotor shaft is a hollow tube, and the lead screw is a spindle or rod disposed to slide in and out of the rotor shaft tube.

19 Claims, 4 Drawing Sheets

U.S. PATENT DOCUMENTS

| | | |
|---|---|---|
| 4,561,606 A | 12/1985 | Sakakibara et al. |
| 4,614,257 A | 9/1986 | Harada et al. |
| 4,778,138 A | 10/1988 | Yamada |
| 4,786,110 A | 11/1988 | Mahling et al. |
| 4,817,771 A | 4/1989 | Iten |
| 4,900,088 A | 2/1990 | Bechtle et al. |
| 4,987,788 A * | 1/1991 | Bausch ............... 74/89.34 |
| 5,010,780 A | 4/1991 | Hatfield |
| 5,050,930 A | 9/1991 | Schuster et al. |
| 5,080,434 A | 1/1992 | Locher |
| 5,086,861 A * | 2/1992 | Peterson ............... 180/445 |
| 5,186,412 A | 2/1993 | Park |
| 5,197,780 A | 3/1993 | Coughlin |
| 5,211,368 A | 5/1993 | Kitamura |
| 5,217,278 A | 6/1993 | Harrison et al. |
| 5,248,017 A | 9/1993 | Schwarzbich |
| 5,382,076 A | 1/1995 | Scheck et al. |
| 5,397,164 A | 3/1995 | Schuster et al. |
| 5,449,219 A | 9/1995 | Hay et al. |
| 5,522,488 A | 6/1996 | Schwarzbich |
| 5,567,010 A | 10/1996 | Sparks |
| 5,567,011 A | 10/1996 | Sessini |
| 5,590,744 A | 1/1997 | Belmond ............... 188/265 |
| 5,593,210 A | 1/1997 | Schwarzbich |
| 5,595,089 A * | 1/1997 | Watanabe et al. ......... 74/89.34 |
| 5,609,394 A | 3/1997 | Ligon, Sr. et al. |
| 5,638,722 A | 6/1997 | Klingler |
| 5,651,584 A | 7/1997 | Chenot et al. |
| 5,681,005 A | 10/1997 | Ligon, Sr. et al. |
| 5,704,687 A | 1/1998 | Klingler |
| 5,769,491 A | 6/1998 | Schwarzbich |
| 5,794,479 A | 8/1998 | Schwarzbich |
| 5,842,659 A | 12/1998 | Ligon, Sr. et al. |
| 5,865,285 A | 2/1999 | Minkenberg |
| 5,881,854 A | 3/1999 | Rougnon-Glasson |
| 6,045,185 A | 4/2000 | Ligon, Sr. et al. |
| 6,050,641 A | 4/2000 | Benson |
| 6,053,064 A | 4/2000 | Gowing et al. |
| 6,158,300 A | 12/2000 | Klingler |
| 6,178,838 B1 | 1/2001 | Schwarzbich |
| 6,212,965 B1 | 4/2001 | Hochmuth |
| 6,227,617 B1 | 5/2001 | von Moller |
| 6,230,867 B1 | 5/2001 | Schwarzbich |
| 6,238,123 B1 | 5/2001 | Schwarzbich |
| 6,253,894 B1 | 7/2001 | Schumann et al. |
| 6,334,651 B1 | 1/2002 | Duan et al. |
| 6,345,549 B1 | 2/2002 | Lance |
| 6,422,651 B1 | 7/2002 | Muhlberger et al. |
| 6,481,557 B2 | 11/2002 | Denis |
| 6,488,134 B2 | 12/2002 | Becker et al. |
| 6,508,347 B1 | 1/2003 | Hochmuth |
| 6,520,307 B2 | 2/2003 | Becker et al. |
| 6,520,583 B1 | 2/2003 | Bonk |
| 6,536,840 B1 | 3/2003 | Schuster, Sr. et al. |
| 6,575,278 B1 | 6/2003 | Schumann et al. |
| 6,592,186 B1 | 7/2003 | Muhlberger et al. |
| 6,637,575 B2 | 10/2003 | Liu et al. |
| 6,675,945 B2 | 1/2004 | Kim |
| 6,681,910 B1 | 1/2004 | Schumann et al. |
| 6,691,851 B2 | 2/2004 | Liu et al. |
| 6,710,565 B2 * | 3/2004 | Maeda ............... 318/466 |
| 6,732,842 B2 | 5/2004 | Nemoto |
| 6,843,533 B1 | 1/2005 | Miyata et al. |
| 7,007,568 B2 * | 3/2006 | MacAulay et al. ......... 74/501.6 |
| 7,052,427 B2 * | 5/2006 | Kapaan et al. ............... 475/4 |
| 2003/0167872 A1 | 9/2003 | Frohnhaus et al. |

FOREIGN PATENT DOCUMENTS

| | | |
|---|---|---|
| DE | 31 45 217 A1 | 5/1983 |
| DE | 29 53 749 | 9/1988 |
| DE | 40 31 656 A1 | 4/1992 |
| DE | 41 29 934 A1 | 3/1993 |
| DE | 230 09 0193 U1 | 8/2003 |
| EP | 0 006 840 B1 | 2/1982 |
| EP | 0 322 525 A1 | 7/1989 |
| EP | 0 751 030 A1 | 1/1997 |
| EP | 0 751 032 B1 | 1/2001 |
| EP | 0 751 031 B1 | 9/2001 |
| EP | 0 885 164 B1 | 7/2002 |
| FR | 2 809 999 A1 | 12/2001 |
| GB | 141801 | 4/1920 |
| GB | 1 218 541 A | 1/1971 |
| GB | 2 057 255 A | 4/1981 |
| JP | 09 327149 | 12/1997 |
| WO | WO 99/05000 | 2/1999 |
| WO | WO 01/74620 A1 | 10/2001 |
| WO | WO 02/11584 | 2/2002 |

* cited by examiner

IN-LINE ACTUATOR APPARATUS AND METHOD

CROSS-REFERENCE TO RELATED APPLICATIONS

This application claims priority of U.S. Provisional Application No. 60/542,365 filed on Feb. 6, 2004.

BACKGROUND OF THE INVENTION

1. Field of the Invention

The present invention relates generally to the field of electric motor powered actuators and, more particularly, to such actuators of moving apparatuses for automobile seats and ergonomic supports.

2. Related Art

The use of electric motors for actuating movement in various assemblies is known. In particular, electric motors are used in assemblies such as automobile seats and moving ergonomic supports within them. The moving parts maybe actuated by applying tractive or compressive force, i.e. by pushing or pulling. When electric motors are used to apply such forces, assemblies must be devised for converting the rotational force of the electric motor shaft to the desired compressive or tractive force that will in turn be linked to the part to be moved. For example, a gear set engaged with the electric motor shaft maybe assembled with a pulley and the pulley connected to a traction cable so that rotation of the electric motor spools the traction cable onto the pulley and thereby applies the traction to a moving part through the traction cable.

In many industries, especially the automotive industry, there is a constant need for decreasing the cost of component parts required, increasing durability, increasing efficiency, and reducing a package size, that is, reducing the amount of space occupied by the components installed to actuate movement. More particularly, there is a need in automobile seating for a package having an electric motor in-line with the force linkage it powers. There is also a need for reducing the size and power of the motor required to impart the necessary amount of force and a further need for reducing the cost, weight and grade of the linkage components, such as traction cables, used to transmit the force to the seat or ergonomic device being moved. Consequently, there is also a need for configuring gear sets, motors and forced transferring linkages such as traction cables with the gear set having a greater gear ratios.

SUMMARY OF THE INVENTION

The present invention is an in-line electric motor actuator. In one aspect of the present invention, an electric motor has a rotor shaft engaged with a gear set within a housing. In this version the gear set can be a planetary gear set. The planetary gears are engaged with a disk, which is fixed to a shaft, rod or other force transmitting component such as lead screw. The lead screw, also within the same or in adjacent fixed housing, is engaged with a traveling block. The assembly of these components allows operation of the motor to turn the gear set, applying a mechanical advantage through its gear ratio to rotation of the disk and thereby rotation of the lead screw. The rotating lead screw is engaged with the traveling block within a housing such that when the lead screw rotates, it is in threaded engagement with the traveling block and causes the traveling block to travel axially along the lead screw. The lateral movement of the traveling block, i.e. its in and out movement, may be linked to further force application linkage components, such as a pin or a cable.

In another aspect of the present invention, an electric motor has a rotor shaft tube. That is, the rotor shaft is hollow along its axis. The rotor shaft tube extends out of the electric motor where it is attached to a gear and is engaged with a gear set. In one aspect of the present invention, the rotor shaft tube is engaged with a sun gear of a planetary gear set. Through its engagement with the gear set, the rotor shaft tube drives a disk, which is coaxial with the sun gear and rotor shaft tube. The disk has a threaded hole engaged with a threaded rod. The rod is coaxial with the rotor shaft tube and translates axially there through. The translation of the rod, that is, the in and out movement, is transferred to further force transmission linkage components. In one aspect of the present of the invention, one end of the rod extends outwardly from the electric motor and gear set. This end of the rod is fixed to a linking device such as a block having a seat adapted to receive, link with and transmit force to another force transmission linkage component, such as a traction cable. Accordingly, the electric motor drives the gear set and rotates the threaded disk, which causes the rod to translate in and out of the electric motor space through the rotor shaft tube. The rod then imparts tractive or compressive force to a next force transmission linkage component.

Thus, in furtherance of the above goals and advantages, the present invention is, briefly, an in-line actuator having a housing, a drive disk rotatably mounted within the housing, a gear set in driving communication the drive disk, an electric motor mounted to the housing, the electric motor having a rotor shaft, and the rotor shaft in driving communication the gear set, a lead screw connected to the drive disk, and a traveling block connected to the lead screw, wherein the electric motor drives the gear set to rotate the drive disk, and the drive disk moves the traveling block in an axial direction via the lead screw.

Further, the present invention is, briefly, a method of assembling an in-line actuator, the method includes the steps of: providing a housing having an inner toothed race; race; mounting an electric motor in the housing, the electric motor having a rotor shaft tube; affixing a sun gear to the rotor shaft tube; inserting planetary gears into engagement with the toothed race and the sun gear; inserting planetary gear axles of a drive disk into the planetary gears; engaging a rod with the drive disk; and engaging a traveling block with an end of the rod.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
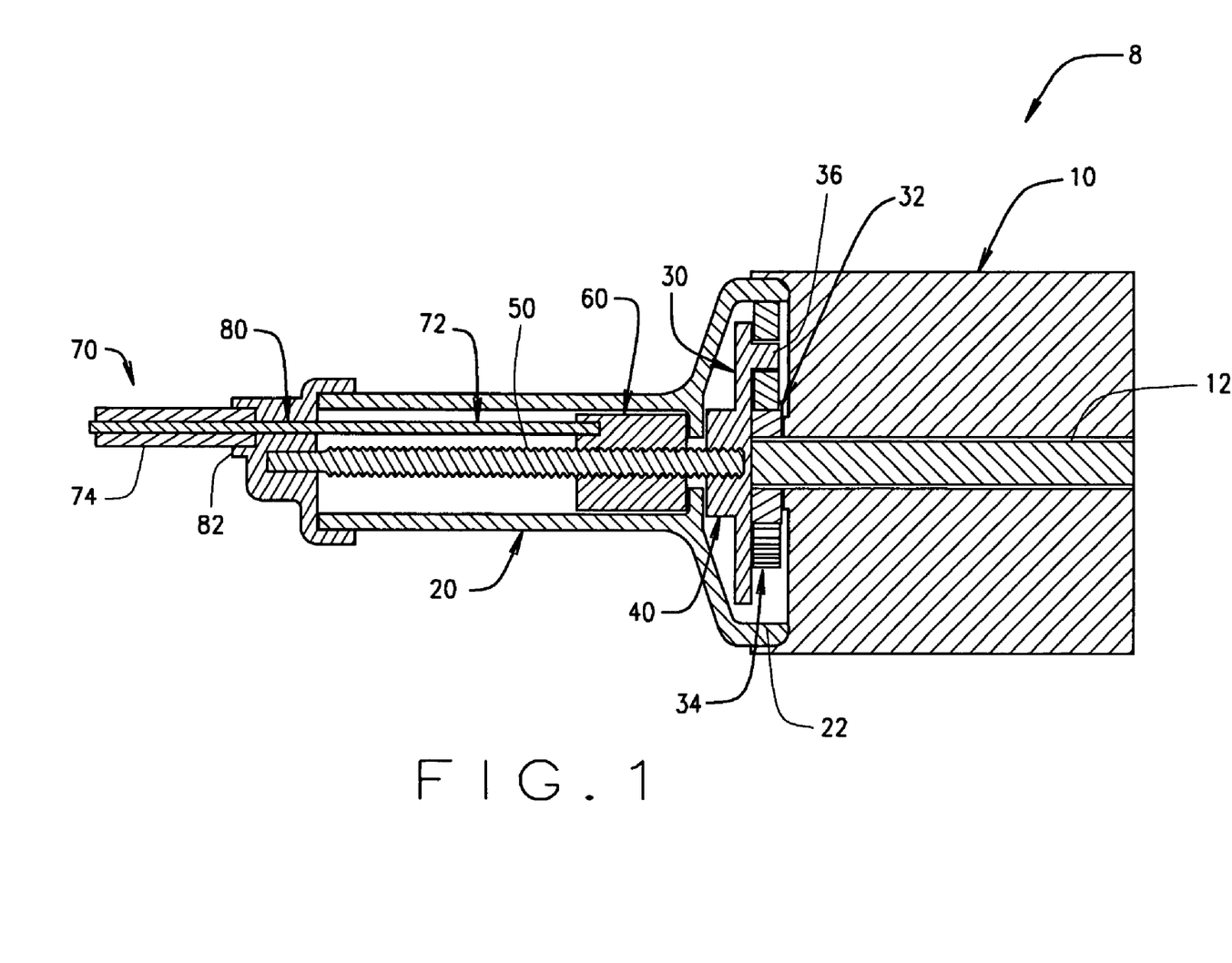
FIG. 1 illustrates a cut away side view of an in-line electric motor actuator.

Referring to the accompanying drawings in which like reference numbers indicate like elements, FIG. 1 is a cutaway side view of a first embodiment of an in-line electric motor actuator, generally designated by reference numeral 8, constructed in accordance with the present invention. The in-line electric motor actuator 8 includes an electric motor 10, which has a rotor shaft 12. Electric motor 10 has reversible polarities, allowing it to power rotation in either direction. Electric motor 10 is fixed to or enclosed within a housing 20. Housing 20 includes a toothed inner race 22 or along the circumference of its inner wall. Also within the housing 20 is a drive disk 40. Drive disk 40 is fixedly attached to a threaded rod or lead screw 50. Lead screw 50 is in turn threadedly engaged with a traveling block 60.

Electric motor rotor shaft 12 is in driving communication with a drive disk 40 through a gear set 30. Gear set 30, in the depicted embodiment, is formed by a sun gear 32 and planetary gears 34. The sun gear 32 is attached to rotor shaft 12 so that when the electric motor 10 is on, shaft 12 will turn sun gear 32. In the depicted embodiment, sun gear 32 is engaged with three planetary gears 34. It is within the scope of the present invention that any manner of gear set 30 may be used to transfer power from rotor shaft 12 to a drive disk 40. Accordingly, it is also within the scope of the present invention that any number of planetary gears may be used. The planetary gears 34, when actuated, revolve around sun gear 32. In order to do so, they are encapsulated in and circumscribed by the toothed race 22 on the inner face of housing 20. One side of each planetary gear 34 engages the toothed race 22, and the other side engages the teeth of the sun gear 32. In this manner, an advantageous gear ratio magnifies the force received from the rotor shaft 12, and outputs to lead screw 50 a higher degree of torque. Accordingly, a smaller and cheaper electric motor 10 may be used.

Each planetary gear 34 turns on an axle 36 which is attached to or integrally formed with drive disk 40. In the depicted embodiment, drive disk 40 is coaxial with rotor shaft 12 and lead screw 50. As planetary gears 34 are driven to revolve around sun gear 32, they carry with them axles 36 and the attached drive disk 40, causing the drive disk 40 to rotate.

Rotation of drive disk 40 in turn rotates lead screw 50. Through a threaded engagement, rotation of lead screw 50 causes traveling block 60 to travel or translate axially inwards or outwards, or to the left and right as oriented in FIG. 1. The traveling block 60 is stopped from self rotating by its engagement (not shown) with the housing 20, such as a rail and slot configuration, or any other non-circular shape.

Having achieved inward and outward movement of traveling block 60, this pushing and pulling force may be transferred to other force transmission linkage components via any configuration within the scope of the present invention. In the depicted embodiment, a traction cable 70, such as a Bowden cable, is used. Traction cables include a generally flexible sleeve or conduit 74. Within the sleeve 74 is disposed a cable 72 which can slide axially there through. One end of the traction cable 70 is attached, as depicted, to an actuator so that traction may be applied to pull the cable 72 from the sleeve 74. The other end of the traction cable 70 is engaged with an object to be moved, such as a lumbar support within a seat or such as a seat mounted for forward and backwards movement along rails. It is within the scope of the present invention that any motion can be actuated by the in-line electric motor actuator of the present invention.

In the depicted embodiment, an auxiliary housing cap 80 provides a seat 82 for the traction cable sleeve 74 in order to hold it still while traction is applied to the cable 72. Traction is applied by mounting a cable end, typically through a bead or bullet (not shown) mounted into a corresponding seat (not shown) in the traveling block 60. When the lead screw 50 is rotated, traveling block 60 applies traction when it travels, which is to the right in the embodiment depicted in FIG. 1, or inwards towards the electric motor 10. This tractive force applied to cable 72 will act at the other end of traction cable 70 to move an ergonomic support, for example arch and lumbar support, or to pull a seat forwards or backwards along a rail.

In assembly, a housing is generally split into substantially two halves when fabricated. The electric motor 10, gear set 30, drive disk 40, assembled lead screw 50 and traveling blocks 60 are placed in a first half of housing 20. Then the second complementary portion, usually a half of the housing 20, is closed over the components and sealed.

A second assembly is undertaken to install the in-line electric motor actuator 8 with a force transmission linkage. In the depicted embodiment, the traveling block 60 is extended to the end (towards the left in FIG. 1) of housing 20. The end of a cable 72 is seated in the traveling block 60 and the housing end cap 80 is installed over the end of the lead screw 50 and into a locking engagement, as for example a snap fit, with the end of housing 20. The traction cable sleeve 74 is placed into sleeve seat 82. A slot allowing installation of cable 72 is not shown.

In operation, an occupant of a seat containing the in-line actuator 8 turns a switch in a first direction and a first polarity of electric motor 10 is powered on. The rotor shaft 12 turns in a first direction, turning sun gear 32 and thereby turning planetary gears 34. Planetary gears 34 turn the drive disk 40 in a first direction. Consequently lead screw 50 is turned in the first direction and traveling block 60 proceeds from a relaxed position, towards the left in FIG. 1 and away from electric motor 10, and travels closer to electric motor 10, or to the right in FIG. 1. This movement applies traction to cable 72, causing movement of the actuator device. For example, if a lumbar support is to be extended, the traction cable 70 will move the lumbar support outward against a seat passenger's weight into a lumbar supporting position, bearing the load of the passenger's weight. When the device reaches a comfortable position, the occupant selects that position by releasing the electric motor power switch. The selected position is held in place by the friction between the threads of the lead screw 50 and the threads on the traveling block 60. When the seat occupant wants to return the ergonomic support to its flat or relaxed position, she toggles the electric motor power switch in the opposite direction. The polarity in the electric motor is reversed and rotor shaft 12 turns in an opposite direction. The gear assembly 30, drive disk 40 and lead screw 50 also turn in the opposite direction. This forces the traveling block 60 outwardly, away from the electric motor 10 and to the left of FIG. 1. This releases traction on the cable 72 and allows the load (the occupant's weight) on the lumbar support to return the lumbar support to a relaxed or flat position.

Figure 2:
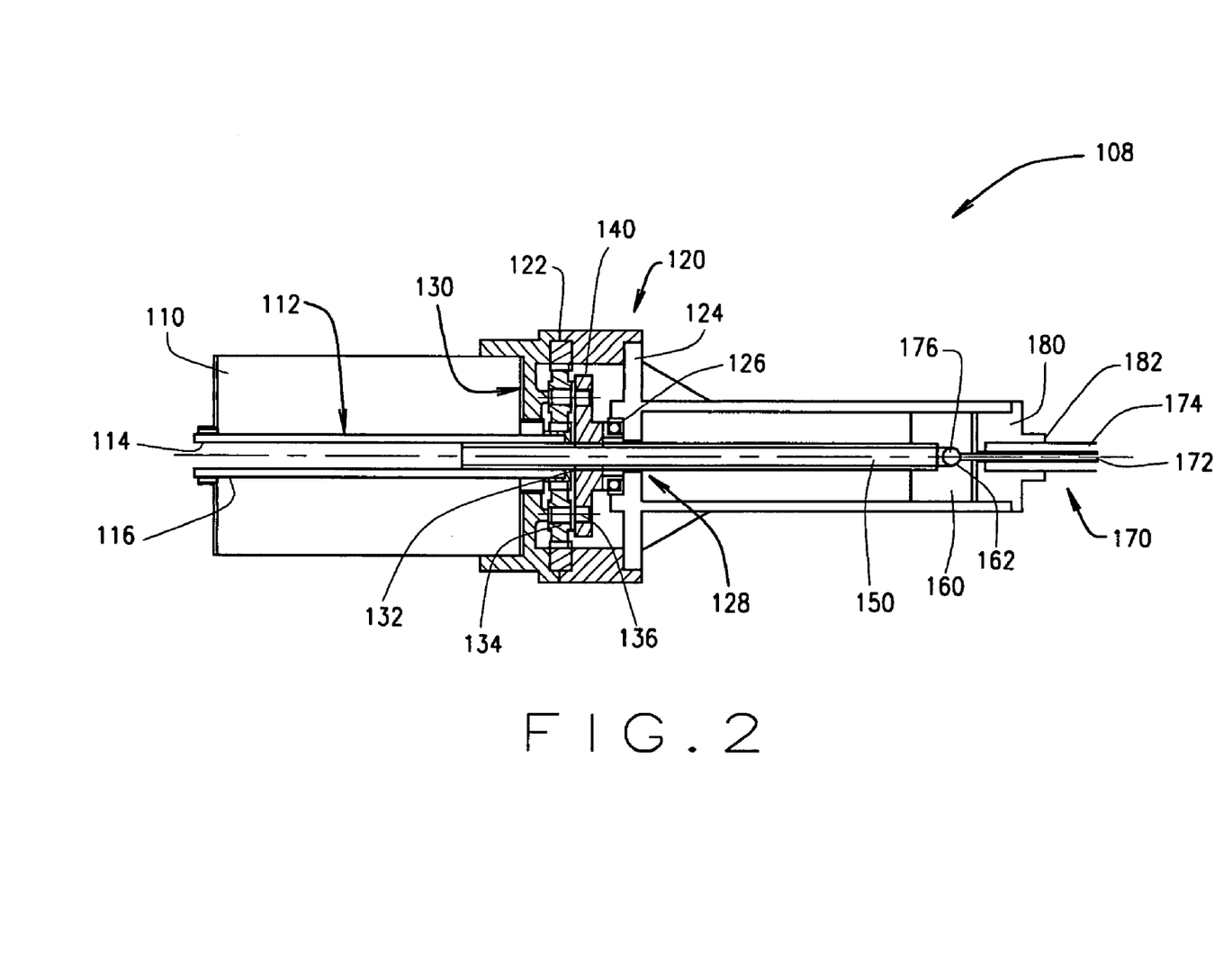
FIG. 2 illustrates a cut away side view of an in-line electric motor actuator having a hollow rotor shaft tube.
Figure 3:
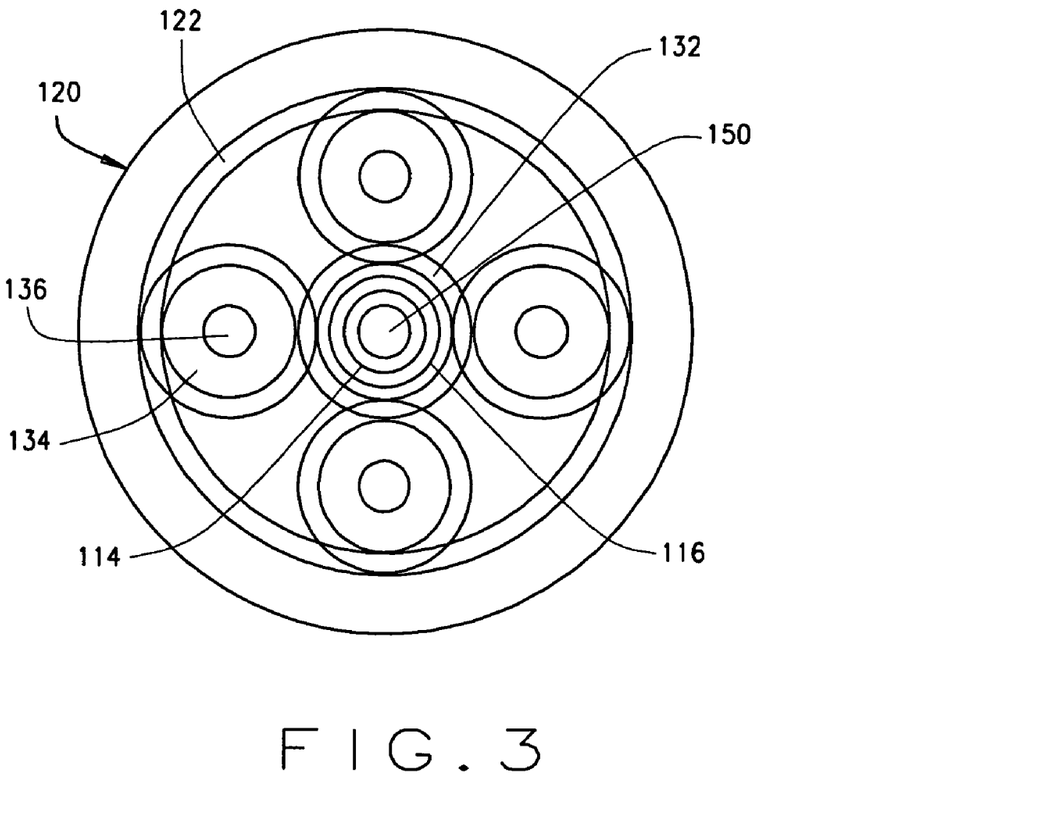
FIG. 3 schematically illustrates an end view of partially dissembled in-line electric motor actuator having a hollow rotor shaft tube.
Figure 4:
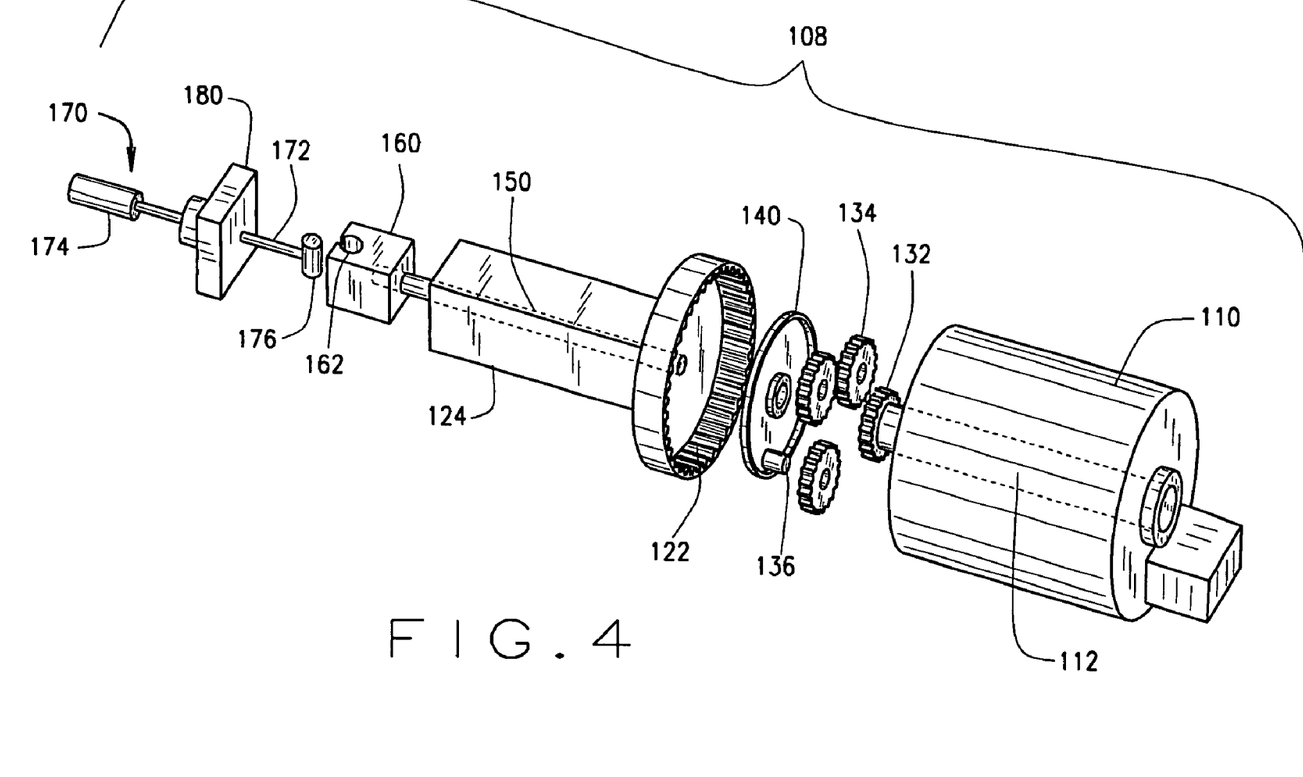
FIG. 4 is an exploded view of an in-line electric motor actuator having a hollow rotor shaft tube.

FIGS. 2, 3 and 4 are a cutaway side view, end view and exploded view, respectively, of an alternative embodiment of the in-line electric motor actuator, general indicated by reference numeral 108, constructed in accordance with the present invention. The second embodiment differs from the first in that the electric motor rotor 112 is a tube rather than a solid axle. Being hollow, it has both an outside diameter 116 and an inside diameter 114. Its outside diameter 116 is fixed to the armature of the motor 110 and functions as a normal electric motor rotor shaft in its relation to electric motor 110 and in being rotated by that motor. In the second embodiment, the hollow rotor shaft tube receives rod 150 within its inside diameter 114. Both configurations reduce the overall package size of the in-line actuator assembly in a radial direction. The second embodiment further reduces size in an axial direction. Additionally, the second embodiment makes possible the extension of rod 150 out of both ends of the electric motor 110, enabling further opportunities for actuating linkages. In the depicted embodiment only the single side of the extension of shaft or spindle 150 is shown.

The embodiment depicted in FIGS. 2, 3 and 4 also has a gear set 130. In the depicted embodiment, it is also a planetary gear set. The rotor shaft tube 112 is engaged with a pinion, which is a sun gear 132. Rotation of rotor shaft tube 112 rotates the sun gear 132. The sun gear 132 is in turn engaged with planetary gears 134, which are circumscribed by and engaged with a toothed race 122 on the inner face of housing 120. Any configuration of a general housing 120 is within the scope of the present invention. In the depicted embodiment, a separate housing piece 124 is fabricated, for example, molded from plastic, in order to allow assembly access to the gear set seating components. The planetary gears 134 (three in the depicted embodiment, alternative embodiments may have different numbers of planetary gears) are engaged with planetary gear axles 136. Axles 136 are attached or integrally formed with drive disk 140. Drive disk 140 is coaxial with and adjacent to rotor shaft tube 112 and sun gear 132.

In the depicted embodiment, rod 150 is threaded on its external surface and drive disk 140 is threaded on an inner surface of an axial through hole. Rod 150 is thread into the through hole of drive disk 140. The gear set 130 and rod 150 are encapsulated within the housing 120 by the fitting of housing component 124 over the gear assembly 130 and drive disk 140. Bearings 126 or bushings may be included. Rod 150 extends through a through hole 128 in the housing.

This assembly allows for the rotational force imparted to the rotor shaft tube 112 to be transferred into axial movement of and force applied through rod 150. Thereafter, any suitable manner of linkage for further transfer of linear force from rod 150 to an object being moved, such as lumbar support or seat, is within the scope of the present invention. In the depicted embodiment, housing component 124 is an elongated shaft containing a traveling block 160. Traveling block 160 is fixed to the end of rod 150, and travels in and out, that is, toward and away from the electric motor 110, with the axial movement of rod 150. The traveling block is fixed against rotation by the configuration of its interface with the inside of housing shaft 124, which in the depicted embodiment is square. The length of shaft 124 may be used to establish end stops for the range of block travel.

Traveling block 160 includes a seat 162 for an end mounting bullet or bead 176 of a traction cable wire 172. The traction cable 170 is further includes a sleeve 174 which is mounted in a sleeve seat 182 of housing cap 180. Accordingly, rotation of a motor 110 in a first direction is transferred by the gear assembly and drive disk to an inwards movement of rod 150, to the left in FIG. 2. This movement draws traveling block 160 away from traction cable sleeve 174, and applies tractive force to traction cable wire 172 in order to draw it from the sleeve. At the other end of the traction cable 170, an ergonomic support or seat or other moving assembly will be actuated into its intended movement.

FIG. 3 is an end view of a partially disassembled in-line electric motor actuator. This is the view that would be visible if the shaft housing 124 and drive disk 140 were removed from housing 120. In FIG. 3 can be seen not only the engagement of planetary gears 134 with the housing race 122 and planetary axles 136, but also their engagement with sun gear 132. Sun gear 132 is fixed to the outside diameter 116 of the rotor shaft tube. The interior diameter 114 of housing shaft tube is wide enough to allow axial travel into it of rod 150. The scope of the present invention would include an engagement of rod 150 with rotor tube 112 that allowed for space between the inside diameter 114 of rotor tube 112 and the outside diameter of rod 150. Alternatively, the interface between the two may be lubricated, augmented with bearings or bushings, or may be a close fit. Rod 150 will be threaded and the threads engage with the internal threads on the through hole of drive disk 140, which has been removed from the partial disassembly depicted in FIG. 3.

FIG. 4 is an exploded view of the in-line motor actuator assembly 108. It advantageously shows the toothed race 122 on the inner face of housing 120. FIG. 4 further depicts the one alternative configuration of the interaction between the traveling block 160 and the housing component 124, i.e. square.

In assembly, electric motor 110 is mounted in housing 120. Sun gear 132 is fixed to rotor shaft tube 112. Planetary gears 134 are inserted into engagement with toothed race 122 and sun gear 132. Drive disk 140 is inserted so that planetary gear axles 136 seat into planetary gears 134. Rod 150 is threaded through the through hole of drive disk 140 and continuously threaded so that rod 150 slides into the hollow inner core of rotor shaft tube 112. Rod 150 is dimensioned so as to not engage or touch sun gear 132. The outer diameter of rod 150 may or may not touch the inner diameter 114 of rotor shaft tube 112. Housing component 124 is installed over the assembly, mounting in place bearings or bushings 126. Housing component 124 may be fixed to housing 120 in any fashion, for example a snap fit. A traction cable mounting bead or bullet 176 is installed in seat 162 and traveling block 160. Traveling block 160 is engaged, as for example, by a snap fit or threaded engagement, with the end of rod 150. The traction cable sleeve 174 is seated onto housing end cap 180 at seat 182 and housing end cap 180 is fixed to housing component 124.

This assembly method may be used for the first embodiment of the present invention shown in FIG. 1, and the longitudinal split halves method described above may be used for the second embodiment, alternatively.

In operation, an occupant of a seat containing the in-line actuator 108 toggles a power switch in order to engage motor 110 in a first polarity. The motor rotates rotor shaft tube 112, in turn rotating sun gear 132. Rotation of sun gear 132 causes planetary gears 134 to revolve around pinion 132 within race 122. This revolution turns the planetary gear axles 136, in turn rotating drive disk 140. The drive disk's 140 threaded engagement with rod 150 causes axial translation of rod 150 inwardly, towards motor 110, and to the left in FIG. 2 (and to the right in FIG. 4). This axial translation of rod 150 pulls traveling block 160, in turn drawing traction cable wire 172 out from traction cable sleeve 174, which is fixedly seated in housing end cap 180. This traction on the traction cable actuates movement of an attached component or device, such as a lumbar support. When the device reaches a position selected by the occupant, the occupant releases the power switch. The frictional engagement of the rod 150 with the drive disk 140 holds the selected position in place against the load of the seat occupants' weight. When the seat occupant wants to return the component or device to its original position, she toggles the electric motor power switch (not shown) in the opposite direction, reversing polarity on motor 110 and causing the sun gear 132 to rotate in the opposite direction. This engagement reverses the rotation of drive disk 140. This reverse rotation is translated through its threaded engagement with rod 150 in order to move rod 150 in the opposite direction, which is outwardly from motor 110 and to the right in FIG. 2 (and to the left in FIG. 4). This movement of rod 150 pushes traveling block 160 outward and releases tension on traction cable wire 172, relative to traction cable sleeve 174. The load on the device being actuated, for example the lumbar support, supplements the movement of the device back to its rest position, which in the example of lumbar support is the flat position.

In addition to minimalizing the package size in a radial direction for both embodiments, (and also in axial direction for the second embodiment) both embodiments of the in-line actuator depicted herein achieve other advantages. An advantageous gear set, for example the depicted planetary gear set, imparts mechanical advantage through its gear ratio, and allows the use of a smaller, less expensive motor. The in-line configuration also allows for the use of the lighter gauge and therefore less expensive cable. This is due to the fact that other actuation systems rely upon pulleys, and the mechanical advantage imparted by them, to spool a traction cable wire onto the pulley in order to draw it from the traction cable sleeve. This of course necessitates bending the cable. Bending the cable requires a stronger cable. The present invention does not bend the cable, but only directly applies to it a linear force that is substantially parallel to the axis of the traction cable as mounted. Such an application of force allows for the use of lighter gauge cable without the possibility of it breaking, thereby maintaining the advantageous durability and life span of the cable, while using less expensive components.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, thus, the breadth and scope of the present invention should not be limited by any of the above-described exemplary embodiments, but should be defined only in accordance with the following claims appended hereto and their equivalents.

What is claimed is:

1. An in-line actuator comprising:
   a. a housing;
   b. a drive disk rotatably mounted within said housing;
   c. a gear set in driving communication with said drive disk;
   d. an electric motor mounted to said housing, said electric motor having a rotor shaft, and said rotor shaft in driving communication with said gear set;
   e. a lead screw connected to said drive disk;
   f. a traveling block connected to said lead screw, wherein said electric motor drives said gear set to rotate said drive disk, and said drive disk moves said traveling block in an axial direction via said lead screw; and
   g. a Bowden cable assembly having a cable portion and a sleeve potion, wherein said cable portion is connected to said traveling block, and wherein said housing comprises a seat to receive said sleeve portion.

2. The in-line actuator according to claim 1, wherein said lead screw threadingly engages said traveling block and said lead screw is rotatably connected to said drive disk for rotation therewith.

3. The in-line actuator according to claim 1, wherein said rotor shaft has an inner diameter and an outer diameter, and said inner diameter receives said lead screw.

4. The in-line actuator according to claim 3, wherein said lead screw threadingly engages said drive disk and said lead screw is affixed to said traveling block.

5. The in-line actuator according to claim 1, wherein said gear set is a planetary gear set.

6. The in-line actuator according to claim 5, wherein said drive disk includes at least one integral axle for receiving at least one planetary gear.

7. The in-line actuator according to claim 5, wherein said planetary gear set includes a sun gear and three planetary gears, said housing includes a toothed inner race, said sun gear is connected to said rotor shaft and said planetary gears ride in said toothed inner race.

8. The in-line actuator according to claim 1, wherein said Bowden cable is in operative communication with a lumbar support.

9. The in-line actuator according to claim 1, wherein said drive disk, said rotor shaft and said lead screw are coaxial.

10. The in-line actuator according to claim 9, wherein said traveling block is enclosed by said housing and wherein said traveling block is prevented from self rotating by engagement with said housing.

11. An in-line actuator comprising:
    a. a housing having a toothed inner race;
    b. an electric motor mounted to said housing, said electric motor having a rotor shaft;
    c. a pinion connected to said rotor shaft;
    d. a drive disk having at least one integral axle;
    e. at least one planetary gear rotatably mounted on said at least one integral axle, said at least one gear engaged with said toothed inner race and driven communication with said pinion;
    f. a lead screw connected to said drive disk; and
    g. a traveling block connected to said lead screw, wherein said electric motor drives said gear set to rotate said drive disk, and said drive disk moves said traveling block in an axial direction via said lead screw; and
    h. a Bowden cable assembly having a cable portion and a sleeve portion, wherein said cable portion is connected to said traveling block, and wherein said housing comprises a seat to receive said sleeve potion.

12. The in-line actuator according to claim 11, wherein said lead screw threadingly engages said traveling block and said lead screw is rotatably connected to said drive disk for rotation therewith.

13. The in-line actuator according to claim 11, wherein said rotor shaft has an inner diameter and an outer diameter, and said inner diameter receives said lead screw.

14. The in-line actuator according to claim 13, wherein said lead screw threadingly engages said drive disk and said lead screw is affixed to said traveling block such that said lead screw moves axially along with said traveling block.

15. The in-line actuator according to claim 11, further comprising a housing component connected to said housing.

16. The in-line actuator according to claim 15, wherein said traveling block is in sliding engagement with an interior of said housing component.

17. The in-line actuator according to claim 11, wherein said Bowden cable is in operative communication with a lumbar support.

18. The in-line actuator according to claim 11, wherein said drive disk, said rotor shaft arid said lead screw are coaxial.

19. The in-line actuator according to claim 18, wherein said traveling block is enclosed by said housing and wherein said traveling block is prevented from self rotating by engagement with said housing.

* * * * *